Apr. 10, 1923.
J. B. FIRESTONE
BAND CUTTER AND FEEDER
Filed Apr. 18, 1922
1,451,442
2 sheets-sheet 1
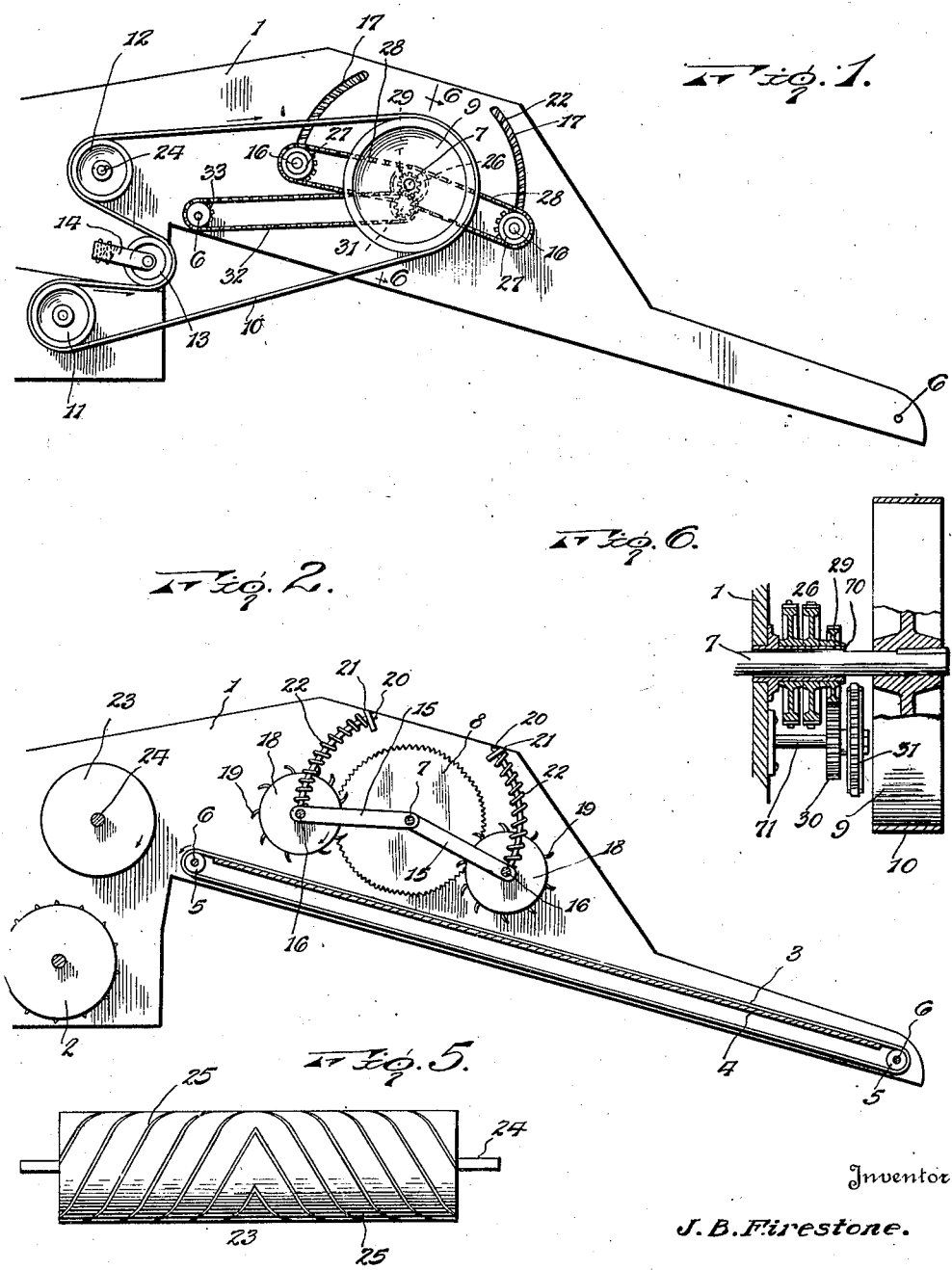
Inventor
J. B. Firestone.
By Lacey & Lacey, Attorneys

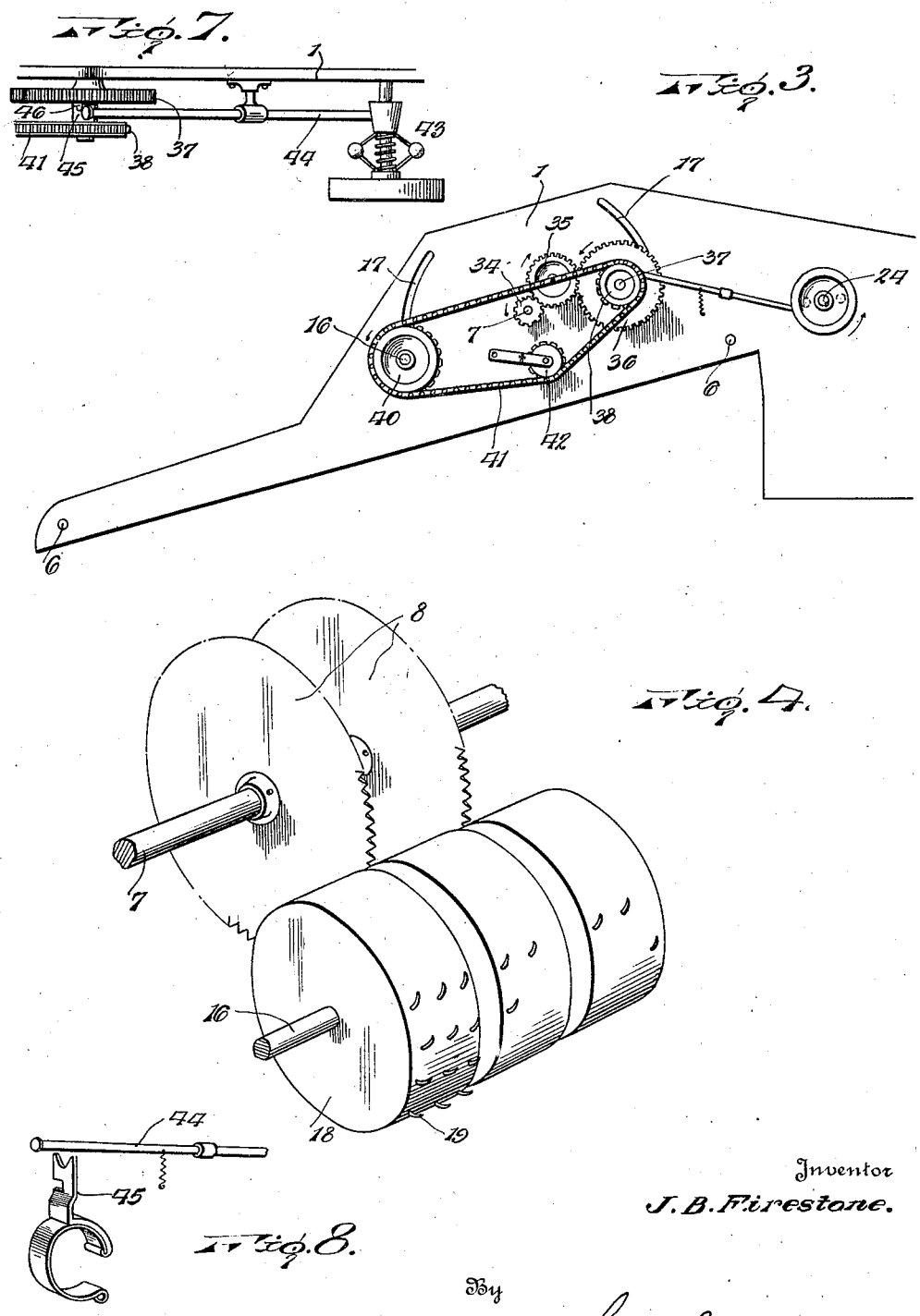

Patented Apr. 10, 1923.

1,451,442

UNITED STATES PATENT OFFICE.

JOSEPH B. FIRESTONE, OF ROANOKE, LOUISIANA.

BAND CUTTER AND FEEDER.

Application filed April 18, 1922. Serial No. 555,162.

*To all whom it may concern:*

Be it known that I, JOSEPH B. FIRESTONE, a citizen of the United States, residing at Roanoke, in the parish of Jefferson Davis and State of Louisiana, have invented certain new and useful Improvements in Band Cutters and Feeders, of which the following is a specification.

My present invention relates to band cutters and feeders and seeks to provide means whereby bound bundles of grain will be fed to a threshing machine and the bands severed as the bundles approach the threshing cylinder positively and easily and the loosened grain spread evenly upon the threshing cylinder. Threshing machines are now generally equipped with means for severing the bands of bundles of grain as the bundles are fed to the threshing mechanism, but these previously known devices are objectionable for various reasons, principally because the bundles are permitted to travel too rapidly to the threshing cylinder so that frequently bands are uncut and the grain is deposited in front of the threshing cylinder in such quantities that the operation of the machine is clogged. It is the object of my invention to provide simple and efficient means whereby the bundles will be retarded in their passage to the threshing cylinder so that they will be prevented from passing the cutters so rapidly that the bands will not be severed, and a further object of the invention is to provide means for spreading or distributing the grain so that it will be delivered to the threshing cylinder evenly throughout the length of the same. A secondary object of the invention is to provide means thereby the retarding devices will be permitted to automatically adjust themselves to the thickness of the bundles of grain while maintaining the desired engagement therewith. Other objects of the invention will appear incidentally in the course of the following description.

In the accompanying drawings, which illustrate one embodiment of my invention,—

Figure 1 is a side elevation of a band-cutting and feeding mechanism embodying my improvements;

Fig. 2 is a longitudinal vertical section of the same;

Fig. 3 is a side elevation looking at the side opposite that appearing in Fig. 1;

Fig. 4 is an enlarged detail perspective view of the retarders and the cutters;

Fig. 5 is a detail elevation of the spreader;

Fig. 6 is a detail section on the line 6—6 of Fig. 1;

Fig. 7 is a detail plan view of a stop-motion device;

Fig. 8 is a detail perspective view of parts of the stop-motion device.

The frame of my improved mechanism comprises side plates 1 which are of proper configuration to support the working parts and arranged in advance and above the threshing cylinder 2 in the usual manner. Between the side plates is disposed an endless conveyor 3, the upper run of which may be supported by a plate 4 which also constitutes a bracing connection between the side plates 1, and this conveyor receives the bundles and carries them upwardly to the band-severing mechanism. The conveyor is supported at its ends upon rollers or drums 5 which are disposed transversely between the side plates in an obvious manner and are carried by shafts 6, as will be readily understood. Mounted in and extending between the side plates 1 above the conveyor 3 and near the upper bight or end of the same is a saw shaft 7 which has secured thereto a plurality of circular saws 8 which may be of any desired diameter according to the capacity of the machine. These saws are arranged in such numbers as may be necessary to act upon all the bundles which may be accommodated by the width of the machine and they are rotated in the direction indicated by the arrow in Fig. 3, so that as the bundles pass below the saws the bands will be engaged thereby and severed. Upon one end at the outer side of the adjacent side plate 1, a band pulley 9 is secured upon the saw shaft 7 and a band 10 is trained around this pulley and around a pulley 11 upon the end of the shaft carrying the threshing cylinder 2 so that power will be imparted to the feeding and cutting devices from the threshing machine cylinder. The band 10 also passes around a pulley 12 upon the end of the spreader shaft and around an idle pulley 13 which is mounted upon the side of the frame and is carried by a yieldably mounted arm 14 so that the said idler operates as a belt tightener. The spreader carrying the pulley 12 will be hereinafter more fully described.

Pivotally mounted upon the saw shaft 7 adjacent the inner faces of the side plates 1 are links 15 which extend respectively forwardly and rearwardly from the said shaft and in their outer ends carry retarder shafts 16, the ends of the retarder shafts playing in arcuate slots 17 in the side plates which slots are concentric to the saw shaft 7, as shown. The retarders consist of drums 18 secured upon the retarder shafts and provided upon their peripheries with teeth 19 adapted to engage in the bundles of grain carried to and past the retarders by the conveyor 3. The peripheral surfaces of the retarders and the saws which are opposed to the conveyor travel in the same direction as the conveyor, and the retarders travel at the same speed as the conveyor so that a bundle of grain placed upon the conveyor will be engaged by the front retarder and will be held to the conveyor so that it cannot be jerked forward by the engagement of the saws which travel at a higher speed and, consequently, the bands cannot slip past the saws without being cut. This result is further attained by the provision of the rear retarders which act upon the bundles in the same manner as the front retarders and prevent them passing so rapidly to the spreading roller that the grain will be permitted to accumulate upon or in front of the threshing cylinder and clog the action of the machine. As illustrated in the accompanying drawings, the retarders are composed of a plurality of drums which are in axial alinement but spaced apart so that the edges of the saws or cutters may enter the spaces betwen two adjacent drums. While I prefer this arrangement, it is to be understood that the retarders may be disposed entirely in advance of or in rear of the saws and may consist of uninterrupted or continuous drums extending from one side plate 11 to the other side plate. Attached to the links or supporting arms 15 which carry the retarders, and rising therefrom, are curved rods 20 which define arcs concentric with the saw shaft 7 and have their upper ends slidably fitted in lugs or projections 21 upon the side plates at the upper edges thereof. Coiled around these rods 20 between the links or arms 15 and the abutments 21 are springs 22 which yieldably hold the retarders in their lowest positions at the lower ends of the slots 17 but permit them to automatically yield to the advance of a bundle larger than the average.

Disposed in rear of the conveyor 3 and above the threshing cylinder 2 is a spreader drum or roller 23 extending transversely between the side plates 1 and having its shaft 24 journaled in said plates, one end of said shaft being equipped with the pulley 12 heretofore mentioned. The spreader drum is provided upon its circumferential surface with spiral ribs or corrugations 25 which are preferably arranged in two series, each extending from the central transverse plane of the drum or roller to an end of the same, as clearly shown in Fig. 5. The roller is so located that the grain passing over the upper end of the conveyor 3 will be engaged by the roller and acted upon by the spiral corrugations thereof so as to be spread evenly in both directions and, consequently, will be delivered in advance of and above the threshing cylinder so that accumulation of grain at some one point in the length of the threshing cylinder will be avoided.

Disposed concentrically about one end of the shaft 7, but loosely mounted upon an extension 70 of the bearing therefor, is a double sprocket wheel 26 and upon the ends of the retarder shafts at the same side of the machine are sprocket wheels 27. A sprocket chain 28 is trained around each sprocket 27 and around one member of the double sprocket 26 so that the two retarders will be rotated at the same speed and may independently rise and fall without becoming operatively disconnected or affecting the tension of the sprocket chains 28. The outer member of the double sprocket 26 has secured to its outer side or formed integral therewith a cog wheel 29 which meshes with a similar cog wheel 30 supported below it and formed integral with or secured to a sprocket wheel 31 which is axially alined with the said cog 30, the cog 30 and sprocket 31 being mounted on a stub shaft 71 projecting from the adjacent side plate 1. A sprocket chain 32 is trained around the sprocket 31 and a sprocket 33 on the end of the shaft 6 carrying the upper conveyor supporting drum or roller 5 so that the conveyor and the retarders will be caused to travel in the same direction and at the same speed. The rear retarder is actuated through the described gearing from the front retarder and the front retarder is driven from the saw shaft by a train of gearing which is located at the opposite side of the machine and is illustrated in Fig. 3. Secured upon the projecting end of the saw shaft at the said opposite side of the machine is a cog pinion 34 which meshes with an idler gear 35 mounted upon the side plate in rear and above the said cog 34 and in turn meshing with a gear 36 which is mounted upon a stub shaft 37 carried by the adjacent side plate 1. It will be readily noted that the idler 35 is of greater diameter than the pinion 34 and the gear 36 is in turn of larger diameter than the idler 35 so that the described train of gearing serves to reduce the speed of the retarder below that of the cutter. Fitted loosely about the stub shaft 37 at the side of the gear 36 is a sprocket 38 which is adapted to be driven by the said gear 36 through an escapement mechanism. A sprocket 40 is secured upon the adjacent end of the front retarder shaft, and a sprocket chain 41 is trained around the sprockets 38 and 40 and also engages an idler 42 which serves as a chain tightener. It will thus be seen that the front retarder is driven from one end of the saw shaft at one side of the machine and at the opposite side of the machine motion is transmitted from the front retarder to the rear retarder so that they both will rotate at the same speed and in the same direction. The escapement may be of any preferred detail construction and is controlled by a governor, indicated conventionally at 43, on the spreader shaft 24. The governor acts upon a trip lever 44 which is mounted upon the side of the frame and has its front end disposed between the gear 37 and the sprocket 38, as shown in Fig. 7. On the inner face of the sprocket 38 is a spring-pressed dog 45 which is normally engaged by a lug or projection 46 on the outer face of the gear 37 so that the sprocket will be forced to rotate with the gear, but if the speed of the threshing cylinder should fall below the minimum speed for which the governor is set, the free end of the lever 44 will drop into engagement with the dog 45 and hold it out of the path of the projection 46 so that no motion will be imparted to the sprocket 38 and the retarders and conveyor will not move until the threshing cylinder again acquires the proper speed. I thereby guard against the grain being delivered too rapidly to the threshing cylinder, and permit the threshing machine to partly clear itself if there should be a tendency of the conveyor to carry the grain to the threshing cylinder faster than the cylinder can act thereon. While the threshing machine cylinder, the spreader drum, and the saw may operate without interruption, the retarders and the conveyors will not be permitted to operate until the threshing cylinder reaches a predetermined speed so that the feeding of the grain will be retarded and clogging of the threshing machine will be prevented. In starting the operation, moreover, the feeding of the grain will not begin until the threshing cylinder attains the proper speed to do good work.

Having thus described the invention, what is claimed as new is:

1. In a band cutter and feeder for threshing machines, the combination of a supporting frame provided with arcuate slots in its sides, a conveyor mounted above said frame, a cutter mounted in the frame concentric with said slots, a retarder shaft playing in said slots, supporting arms mounted upon the axis of the cutter for swinging movement and having the retarder shaft mounted in their free ends, a retarder fitted upon said retarder shaft, arcuate rods rising from the retarder shaft and playing through abutments on the frame, and springs coiled around said rods between the retarder shaft and said abutments.

2. In a band cutter and feeder for threshing machines, the combination of a conveyor, a cutter mounted above the conveyor, and retarders mounted above the conveyor and in front and in rear of the cutter and adjacent the cutter.

In testimony whereof I affix my signature.
JOSEPH B. FIRESTONE. [L. S.]